United States Patent [19]

Yamamoto

[11]  4,395,651

[45]  Jul. 26, 1983

[54] LOW ENERGY RELAY USING PIEZOELECTRIC BENDER ELEMENTS

[76] Inventor: Yujiro Yamamoto, 1201 Via La Jolla, San Clemente, Calif. 92672

[21] Appl. No.: 253,119

[22] Filed: Apr. 10, 1981

[51] Int. Cl.³ .............................................. H01L 41/08
[52] U.S. Cl. ..................... 310/317; 310/330; 310/331
[58] Field of Search ............... 310/311, 317, 318, 319, 310/330–332, 314, 316; 200/181; 361/211

[56] References Cited

U.S. PATENT DOCUMENTS

| | | | |
|---|---|---|---|
| 2,167,254 | 7/1939 | Skellett | 310/331 X |
| 2,182,340 | 12/1939 | Hearn | 310/332 X |
| 2,185,966 | 1/1940 | Pfanstiehl | 310/321 X |
| 2,195,417 | 4/1940 | Mason | 310/317 X |
| 2,714,642 | 8/1955 | Kinsley | 310/332 X |
| 2,800,551 | 7/1957 | Crownover | 310/331 X |
| 2,835,761 | 5/1958 | Crownover | 310/331 X |
| 3,336,529 | 8/1967 | Tygart | 310/321 X |
| 4,093,883 | 6/1978 | Yamamoto | 310/317 |
| 4,190,336 | 2/1980 | Frank et al. | 310/332 X |
| 4,198,140 | 4/1980 | Frank et al. | 310/331 X |

Primary Examiner—Mark O. Budd
Attorney, Agent, or Firm—Grover A. Frater

[57] ABSTRACT

A remote disconnect coupler 18 for accomplishing switching at the end of a transmission line 12 between a test apparatus 24 and normally connected equipment 20 in response to signals from a remote command apparatus 16 includes a piezo-electric switch actuator 26 and command identification apparatus 28. In preferred forms the identification apparatus times reswitching and accomplishes snap switch action with oscillatory switch actuators 150 and dual switch actuators 116, 120.

29 Claims, 15 Drawing Figures

LOW ENERGY RELAY USING PIEZOELECTRIC BENDER ELEMENTS

TECHNICAL FIELD

This invention relates to methods and means for accomplishing switching in response to signals that share the signal transmission line with other signals.

BACKGROUND ART

There are a number of circumstances in which it is necessary or desirable to accomplish a relay operation with signals that are applied to the relay by a signal transmission line that is used in the transmission of other signals. That gives rise to the problems of how to prevent the presence of a relay in the circuit from having adverse affect on those other signals, how to distinguish the relay control signal and how to control and accomplish both switching and resetting. One example is found in the requirement to use electric power or telephone lines in the selective, remote, shut down of energy consuming apparatus. Another example of the problem occurs in telephone systems.

The telephone line that is used to communicate voice signals must also be used to transmit tones and to operate coin return switches and a telephone ringer. Several elements or pieces of apparatus are connected to the line. Each is operated with a different kind of signal—all transmitted through the same line. It is required to keep each piece of apparatus from degrading signals intended for other pieces of apparatus, and to prevent each piece of apparatus from responding except to its own signal. That problem has existed in telephone systems for a long time. Signals, and the apparatus that responds to them, have been developed to entirely compatible form. That was possible because of standardization within the telephone industry itself, and because of protective laws that prohibited intrusion by others into the telephone lines.

That situation is changed by recent developments in the law. Telephone company customers now have the privilege of connecting their own telephone systems and their own modum and computer and patching interface equipment to the telephone lines. When a customer experiences difficulty with his telephone system, he may not be able to determine whether or not it is the telephone line itself or the apparatus that he has connected to the system which is the cause of the trouble. It is far easier to lodge a complaint with the telephone company than to attempt to find the manufacturer of the modum or the non-standard telephone or other non-standard apparatus to which the telephone line is connected. The costs to telephone companies of servicing such complaints can become excessive. A means is required at the interface between the telephone line and the customer supplied equipment by which the telephone company can determine with relative ease and minimum expense whether, its line or the customer supplied equipment is defective.

Some means is required for conducting a test of the line without testing or effecting the customer supplied apparatus. That can be done by disconnecting the telephone line from the customer supplied apparatus and connecting it, instead, to a test apparatus. That test apparatus can be passive or active. A passive apparatus would consist of a load of known electrical impedance. An active apparatus would be an alternating current generator whose frequency is changed across the pass band of the telephone line during a test.

Either of those schemes requires disconnection of the customer's apparatus from the telephone line for the period of the test. The problem can be simplified if the test apparatus, instead of being connected to the line continuously, is connected only during the period of the test. Of course, it is preferable that the test be conducted at the customer's facility where the line joins the customer supplied apparatus. Any useful solution of the problem will permit the test to be conducted remotely from a telephone company's central station or test facility.

Switching at the line end from customer apparatus to a test apparatus can be accomplished with a relay at the line end if a way can be found to operate the relay remotely. The telephone line itself can be used to send one or more signals that operate the relay to disconnect the customer supplied apparatus, connect the test apparatus to the line, and, when the test is complete, disconnect the test apparatus and reconnect the customer supplied apparatus. That arrangement will remove the test apparatus from the line except during the test period. However, the signal sensing element of the relay that is responsive to the relay operating signal must remain connected to the line. One of the requirements of the signal sensing element is that it not load the telephone line. The electromagnetically operated relay that is conventional in the telephone system can not meet that requirement. Its impedance is simply not high enough and it uses too much power. Another arrangement must be found.

There are several kinds of apparatus that will accomplish switching and that exhibit high electrical impedance. There is an electrostatic relay that exhibits high impedance. It utilizes electrical actuation and mechanical switch operation. Examples of such switches can be seen in U.S. Pat. No. 4,093,883 to Yujiro Yamamoto. Another, and more obvious, choice is solid state electronic switching. Neither choice is without problems. Any test will require some time period to complete. Separate "start-test" and "return-from-test" signals may be used, or a timer at the line end may be used to provide automatic return-from-test after a time delay. Neglecting cost and size considerations, incorporating the timer is not difficult in either the solid state or electrostatic relay. In the case of electrostatic relays that employ a deformable piezo-electric element to produce mechanical contact movement, delay is introduced by limiting discharge rate. But that produces slow mechanical actuation of the relay contacts and, in a telephone system where voltages are relatively high, the result is arcing that shortens contact life. The electrostatic approach presents other problems as well. Nonetheless, the solution which this invention provides has the electrostatic relay as its base.

DISCLOSURE OF INVENTION

The invention provides an improved remote switching system for use in telephone systems, in power distribution systems, and in other applications where the activating signals must share the signal or power transmission line with other signals. In addition, the invention provides an improved piezo-electric switch which is useful not only in the system application described above, but which has general applicability. One of the features of the improved switch and of the remote switching circuitry is rapid and, optionally, snap action.

Snap action in the piezo-electric switch of the invention can be provided electrically, mechanically, or magnetically. For remote switching application in lines that must be shared with other signals, it is the electrical snap action arrangement that is preferred. It is accomplished by using two piezo-electric switches or a circuit arrangement that permits signal reversal for switch resetting. The remote switching system for the telephone application includes means for distinguishing between the switch actuating signals and other signals that may appear on the telephone line.

For remote switching telephone line testing, for disconnection and connection of service, and similar applications, it is an object of the invention to provide a system that will not unreasonably load the line in either on or off condition, which can distinguish between the switching signals and other signals, which will have no adverse affect on the other signals or the response of the apparatus to those other signals, and, more particularly, which will not affect or be affected by ring signals or voice signals or dial tones or many of the clicks and cross-talk that ordinarily appears on telephone lines. Extreme reliability and very low cost is required. There are in excess of 160,000,000 telephones in the United States, and additions are made at the rate of six to seven percent per year. In most telephone lines and installations there will be no need to conduct any test. In cases where a test is required, the switching apparatus may stand idle many years before it is called upon to operate. Those circumstances impose a requirement for the very highest reliability, the very lowest cost, small size, and insensitivity to widely variable environmental conditions. It is an object of the invention to provide a system and an improved switch that will make it possible to meet all of those requirements and more.

Most telephone systems include three wires, called the ring, tip and collar lines. In one preferred embodiment of the invention it is possible to connect the remote switching apparatus across any pair of those three lines for the purpose of sensing switch actuating signals.

In certain systems it is preferred to utilize direct current energization of the piezo-electric switch actuation element and d.c. voltage level to distinguish relay control signals. In other cases, such as in telephone lines where the voice signal is transmitted as amplitude modulation on a carrier signal, alternating current signals are used to excite a piezo-electric element that is weighted to make it oscillate mechanically at the signal frequency. Snap action can be provided by two piezo-electric elements, both oscillatory or one oscillatory to control the d.c. charge state of the other.

In recognition that understanding is facilitated by examples, description of some of the features of the invention has been postponed to or expanded in, the description of preferred embodiments that follows. It is to be understood that other embodiments of the invention are possible and that equivalent structures other than those specifically mentioned are possible within the invention.

DESCRIPTION OF THE PREFERRED EMBODIMENT

Figure 1:
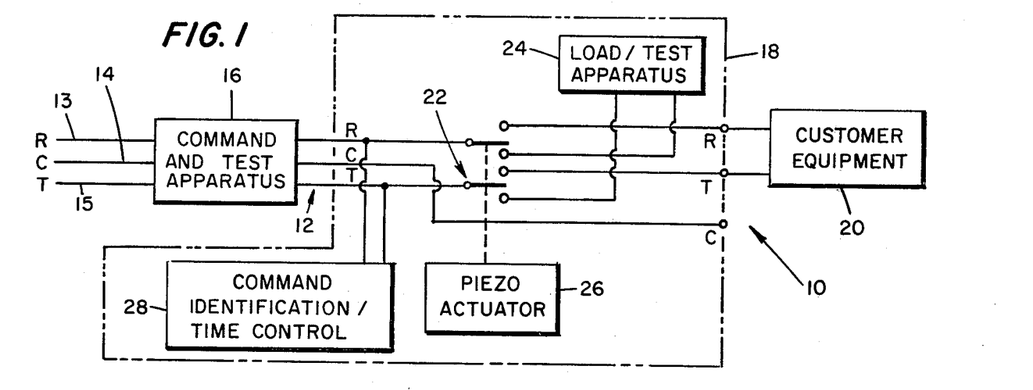
FIG. 1 is a schematic diagram of a system in which the invention is embodied.

The telephone system 10, which is diagrammed in FIG. 1, includes a three-wire transmission line 12 the lines of which are numbered 13, 14 and 15. Industry designations for those lines are ring, tip and collar, or simply R, T and C. A COMMAND AND TEST APPARATUS 16 is connected to the line which terminates in a special coupler 18. The coupler has three output terminals, R, T and C, to which a telephone instrument or other equipment may be connected. In this case it is assumed that equipment supplied by the customer or subscriber is connected across two of the output lines. There is provision in the coupler 18 for switching the ring and tip lines. Because it is a purpose to disconnect the CUSTOMER EQUIPMENT 20 from the transmission line 12, that equipment is connected across those ring and tip lines. Normally, the coupler switches are set to maintain the CUSTOMER EQUIPMENT connected to the telephone transmission line.

When it is desired to conduct a test to determine whether the transmission line 12 is in proper functioning order, the CUSTOMER EQUIPMENT is disconnected from the line by a single-pole or two-pole, double-throw switch, such as switch 22, and the line is connected, instead, to a LOAD OR OTHER TEST APPARATUS 24.

The specific form of the COMMAND AND TEST APPARATUS and the LOAD/TEST APPARATUS will depend upon the character of the test to be conducted and by the form of the signal which is to result in line switching. In most cases the test will be conducted by applying an A.C. signal to the line and sweeping the frequency of the signal across the pass band of the line. A dummy load, including both resistive and reactive impedance, could be energized by that signal at the other end of the line. Voltage and current measurements made at the COMMAND AND TEST APPARATUS 16 would permit evaluation of the line. The character of the test and the nature of the test apparatus in such an arrangement need not differ from the present test practices of the telephone companies.

In FIG. 1 a command signal is introduced to the line 12 at the COMMAND AND TEST APPARATUS station 16. That signal may have any of several forms, but whatever its form it must be compatible with the transmission line, and it must be detectable by a detector which can distinguish it from other signals that may appear on the line. Normal line signals include voice signals, audio frequency tones, ring signals, direct current voltages, digital and other coded signals, and various clicks, cross-talking and other noise. Ring signals are usually alternating voltages between 100 to 200 volts superimposed on a d.c. voltage of about 48 volts. Ring signal frequencies in the range 16 Hz to 36 Hz are usual. The ring is intermittent and usually is about two seconds long, followed by four seconds off. The "off hook" line voltage is usually only a few volts. A ninety volt line voltage is often used to release coins at pay telephones. The polarity of that ninety volt coin release signal can be reversed. In carrier type transmissions the voice signal is transmitted by modulating a carrier signal.

In the conventional, non-carrier system the command signal can be a d.c. voltage applied to a circuit that is insensitive to voltages up to and including the 48 volt "on hook" voltage. By connecting the actuator across a telephone line in series with an element that is rendered conductive only when subjected to a higher voltage, 60 volts for example, the actuator will be subjected to 30 volts upon application to a 90 volt coin release signal to the line. Thirty volts will produce enough deformation of a piezo-electric actuator to operate switch contacts from one switch state to another. A Zener diode or a cold gas discharge tube, such as a neon tube, which is rendered conductive at a voltage near 60 volts, will provide the required function. It will prevent response by the piezo-electric actuator to the 48 volt "on hook" potential.

Voice signals contain much less energy than is contained in ring signals. A filter which will discriminate against ring signals will also discriminate against voice signals, clicks and cross talk. Some form of resistance-capacitance filter can be used to discriminate against those alternating and pulsing signals. A piezo-electric element exhibits electrical capacitance. Thus, in some cases no more is required than to include a resistor in series with the piezo-electric actuator's charging circuit. If re-switching is timed by timed discharge of the actuator, or if the capacitance of the actuation is not a convenient value for ring signal filtering, a somewhat more discriminating filter may be desirable or required.

Thus it is that a basic relay control system capable of distinguishing a control signal from the other signals that appear on a telephone line need only comprise a Zener diode or neon lamp in series with the piezo-electric actuator and a filter resistor. In that arrangement the actuator will respond to an ordinary coin release signal. Since coin release is accomplished with telephone company apparatus, there is no need for the invention on a pay telephone line. Thus, use of the coin release signal for remote testing is not a compromise.

The basic switch operation circuit can be used both for initial switching and for reswitching to return the line to normal condition. The piezo-electric switch actuator stores its energy as mechanical deformation. The switch can be latched by opening any discharge path. It is not necessary to continue application of the coin return or other higher voltage signal to maintain the switched condition. Timing is accomplished by controlled discharge of the piezo-electric actuator or by simple reversal of the coin return voltage to force discharge of the actuator. That is entirely practical in the invention because the direction of piezo-electric actuator deformation is determined by charge polarity. There is no need to control the period of application of the control set and reset voltages.

Other arrangements are possible in the invention. The control signal may be formed by a continuous d.c. voltage, an alternating voltage, an interrupted d.c. voltage, or one or more audio tones. The list includes others, but the direct current control arrangement described above is now preferred and is shown in several of the figures of the drawing. In FIG. 1 the charge on piezo-electric actuator 26 is controlled by what is called a COMMAND IDENTIFICATION AND TIME CONTROL UNIT 28, or simply CONTROL UNIT 28.

Figure 2:
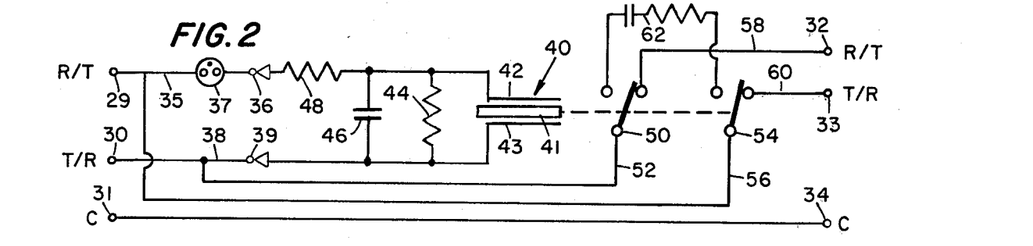
FIG. 2 is a schematic diagram of a portion of the apparatus of FIG. 1.

FIG. 2 shows a basic circuit arrangement for the coupler unit—the unit that is represented by the numeral 18 in FIG. 1. It has three input terminals, 29, 30 and 31, and three output terminals, 32, 33 and 34. Line 35 connects terminal 29 to a terminal 36 through a neon lamp 37 which fires typically at about 62 volts and conducts in both directions. Line 38 connects terminal 30 to a terminal 39. The piezo-electric actuator 40 and its ring signal filter and timer circuit are connected across terminals 36 and 39. The actuator 40 may be and, in this case, is conventional in form. The symbol shown represents both the single layer and the multi-layer types. Actuator 40 comprises a thin bar 41 of piezo-electric ceramic having conductive layers on its opposed faces. In this case the bar 41 is a bi-morph type. Only the outer conductive layers 42 and 43 are shown. The bar is a good dielectric. Leakage current is negligible. The bar bends when its conductive layers are oppositely charged. The degree of bending is determined by the strength of the electric field developed between the conductive layers. The bar returns to normal relaxed condition when the charge is removed so it behaves like a spring which is stressed by electrical force.

While the form is not critical, the piezo-electric bar is mounted at one end and it bends as a cantilever. Movement of the other end is used to actuate switch contacts either indirectly or directly in the case of a contact mounted on the bar. At a normal "on hook" condition of the telephone line, i.e. 48 volts d.c., because of the neon lamp there is no voltage across the piezo actuator to distort it. Filtering of ring signals to prevent actuation of the piezo-electric switch by alternating ring signals and others is accomplished by the combination of the capacitance of the piezo-electric actuator 40, a resisitor 44 connected in parallel with the actuator, a capacitor 46 connected in parallel with actuator 40 and the resistor 44, and a series resistor 48 in series with the parallel elements. When a high voltage, such as a coin return voltage, is applied across terminals 29 and 30, sixty of those volts will appear across the lamp 37. The remaining voltage appears across resistor 48 and the parallel circuit. Resistor 48 is relatively small whereby capacitor 46 and the actuator are charged rapidly. The actuator 40 bends and actuates the double-pole, double-throw switch contacts. Pole 50 is connected to line 38 by line 52. Pole 54 is connected to line 35 by line 56. In the absence of actuator energization, contactor 50 is connected to line 58 and terminal 32 and contactor 54 is connected to line 60 and terminal 33. When the actuator 40 is energized, the two contactors are moved to their respective opposite poles and are connected to opposite ends of a standard load circuit 62. The load, which comprises a capacitor and resistor in series, is then connected by line 52, 38, 56 and 35 across line terminals 29 and 30. Whatever testing is to be done can be done with load 62 at the end of the telephone line independent from whatever may be connected across output terminals 32 and 33.

Ordinarily, the control voltage would be removed from the line prior to beginning the test. The switch will remain in the test position until the charge on the actuator is dissipated in some degree, which depends upon contact design and whether or not provision is made for latching. The charge dissipates in this case through the parallel resistor 44 at a rate determined by the resistance value of the resistor and the capacitance value of the actuator and capacitor in parallel.

Figure 3:
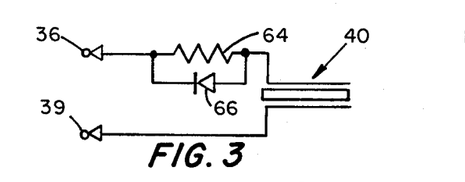
FIG. 3 is a circuit diagram of an alternative form of a portion of the circuit of FIG. 2.

This circuit does not include latching. As the actuator is discharged it returns to relaxed condition. If discharge is accomplished slowly the contacts may open slowly and arcing may occur. Whether that can be tolerated depends upon the application. If it cannot be tolerated, one solution is to omit the time delay circuit and to send two control signals, one to actuate the switch and one to reset it. If the resistors 44 and 48 and capacitor 46 are removed and replaced with the parallel resistor 64, rectifier 66 combination shown in FIG. 3, the switch can be set by applying the coin return or other d.c. control voltage to the input terminals and the switch can be reset by reversing and applying the control voltage. Another way to solve the problem of slow switch opening and closure is to incorporate snap action in the relay such that the force of the bar exceeds, or is decreased, over a given threshold level whereupon the relay contacts are switched.

Figure 4:
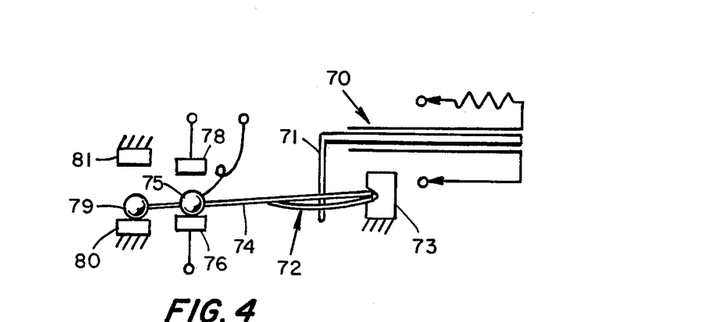
FIG. 4 is a schematic diagram of a mechanical and magnetic latching system for use in the invention.

FIG. 4 illustrates how snap action can be introduced into the circuitry of FIG. 2 by the addition of mechanical or magnetic latching, or both. In FIG. 4, the numeral 70 designates the actuator of a piezo-electric switch. The rod 71 is fixed at one end to the moveable end of the piezo-electric element. The other end of rod 71 is fixed to an overcenter spring mechanism 72 which is pivoted on a pivot block 73. Movement of the bowed portion of the overcenter mechanism to one side or other of the main leaf 74 results in movement of the moveable contact 75 from one of the fixed contacts 76 to the other fixed contact 78. After a given degree of movement of the piezo-electric actuator, the bowed portion of the mechanism will be forced to the opposite side of the leaf 74 at which time the leaf 74 will spring to its opposite position. A mass 79 of magnetic material is fixed at the end of an extension of the member 74. It is magnetized, and it is attracted to the two fixed magnetic members 80 and 81 which are positioned at the limit of travel of the member 74 so that the magnet 79 engages member 80 in one position of the member 74, and so that it engages the magnetic member 81 in the other position of member 74. The magnetic action makes it necessary to develop some minimum force in the piezo-electric element 70 before the sealing force between the magnet and the magnetic pieces 80 and 81 is overcome. Once that sealing force is overcome, then the member 74 is free to spring to the opposite side, there to be engaged by the other of the magnetic members.

Figure 5:
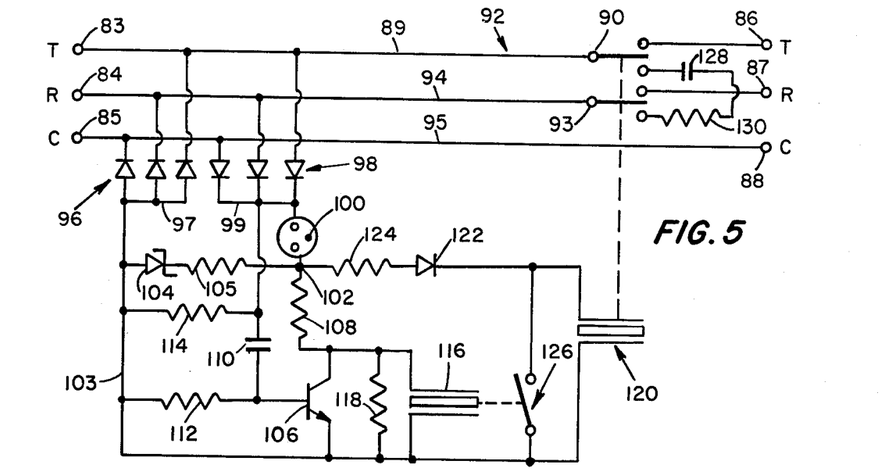
FIG. 5 is a circuit diagram of an alternative to the circuit arrangement of FIG. 2.

FIG. 5 shows a variation of the circuit of FIG. 2 which employs electrical latching. This circuit also includes an active filter for preventing response to ring signals and other periodic signals. In still another feature, FIG. 5 includes an arrangement for responding to control signals that are applied to any pair of the three telephone lines. The input terminals in FIG. 5 are numbered 83, 84 and 85, respectively. The output terminals are numbered 86, 87 and 88, respectively. Terminal 83 is at one end of line 89, and that line connects to one contactor 90 of a double-pole, double-throw switch generally designated 92. The other contactor 93 of the switch is connected by line 94 to the input terminal 84. Terminals 85 and 88 are interconnected by a line 95. A first array 96 of three diodes interconnects line 97 with each of the three lines 89, 94 and 95. A second array 98 of oppositely polarized diodes interconnects line 99 with each of the three lines 89, 94 and 95. A neon lamp 100 is connected between line 99 and a circuit point 102. Line 97 is connected to a line 103. A voltage regulation circuit formed by the series combination of a Zener diode 104 and a resistor 105 is interconnected between line 103 and circuit point 102. The emitter and collector of a transistor 106 are connected in series with a resistor 108 between line 103 and circuit point 102. The base of the transistor 106 is connected to line 99 through a blocking capacitor 110. The two resistors are connected from line 103 to the respective opposite sides of the capacitor 110 to form a prime network filter. The resistor on the transistor base side of the capacitor is numbered 112, and the other transistor is numbered 114. That network responds to ring signals and low frequency noise to apply a potential to the base of transistor 106 as a consequence of which the transistor is turned on to effectively short circuit the actuator 116 of a first piezo-electric switch. The actuator is connected across the emitter-collector terminals of the transistor in parallel with a discharge resistor 118.

A second piezo-electric element has an actuator 120 one side of which is connected to line 103 and the other side of which is connected to circuit point 102 through a diode 122 and a dropping resistor 124 in series. The actuator 116 operates a set of contacts generally designated 126 which are connected across the actuator 120 of the second piezo-electric switch and are effective to short circuit that actuator when the switch 126 is closed. The actuator 120 is connected to switch 92. In some circumstances a single-pole switch is preferred. In others, it is preferred to employ a double-pole, double-throw switch as shown. During normal operation that switch is shown so that lines 89 and 94 are connected to output terminals 86 and 87, respectively. However, when the actuator is energized, double-pole, double-throw switch is actuated to the other switch state in which lines 89 and 94 are connected to opposite sides of a load circuit which includes the series combination of a capacitor 128 and a resistor 130.

In this circuit the actuator 116 is energized through the diode arrays and the neon lamp 100 and resisitor 108 whenever a high voltage control signal is applied to one pair of the three wire line. Energization of the actuator opens switch 126 and that permits the charging of piezo-electric actuator 120 through the diode array, the neon lamp 100, and the combination of resistor 124 and diode 122. When the command signal is terminated the actuator 116 begins to discharge through resistor 118. Because switch 126 is open, and because diode 122 prevents reverse flow through the charging circuit and filter circuits, the actuator 120 remains charged. After a time delay the charge on actuator 116 will have been sufficiently dissipated through resistor 118 so that the actuator distortion will be diminished and the switch 126 will be closed. Switch 126 closes to complete the short circuit across the actuator 120 which is then rapidly discharged and the contactors 90 and 93 will be returned with a snap action to reconnect terminals 86 and 87 to lines 89 and 94, respectively.

Figure 6:
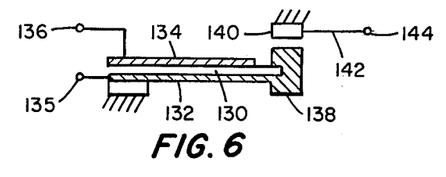
FIG. 6 is a schematic diagram of an oscillatory piezo-electric switch actuator.

FIG. 6 depicts a modified form of piezo-electric actuator. The showing is schematic but the preferred structural form utilizes a piezo-electric element in flat bar form, in particular a bi-morph structure, anchored at one end so that the other end cantilevers as the element is bent in response to being subjected to an electric field. The bar is numbered 130. It has a conductive layer 132 on one face and a conductive layer 134 on its opposite face. Those layers are connected to terminals 135 and 136 which are connected to be energized from the telephone line. Thus far described, the piezo-electric actuator is similar to the actuators previously described. That is, the cantilever end is bent in a direction that depends upon the polarity of the electric field to which the element is subjected. The degree of bending is determined in part by the magnitude of the electric field which is varied by varying the applied voltage. When the field is removed or allowed to decay the piezo-electric element will return to its original position. Thus, the piezo-electric element behaves like a spring. The stress that produces the spring movement is applied electrically rather than mechanically. However, the actuator can also be bent by the application of mechanical force. If that is done a voltage is generated in the piezo-electric element so the law of conservation of energy is not violated. In this embodiment a mass 138 is connected to the cantilever end of the actuator. It is made electrically conductive and it is interconnected with the energizing layer 132. The weight 138 serves as a moving contact in cooperation with a fixed contact 140 which is connected by a line 142 to an output terminal 144. Terminal 135 is interconnected with terminal 144 when the actuator is bent sufficiently to bring the contact weight 138 into engagement with fixed contact 140. The piezo-electric element acting as a spring will cooperate with the weight 138 to form a mechanically oscillatory system. If the oscillations are sufficiently wide the moveable contact 138 will engage fixed contact 140 during the course of oscillation. Mechanical oscillation also can be initiated by subjecting the piezo-electric bar 130 to an alternating magnetic field. An alternating potential is applied across terminals 135 and 136, and if that potential alternates at the resonant frequency, and harmonics and sub-harmonics of the resonant frequency, of the weighted actuator, the actuator will go into mechanical oscillation. If the applied alternating voltage is sufficient in amplitude, the mechanical oscillation will be great enough to cause fixed contact 140 to be engaged by the moveable contact 138. Closure of the contacts is only momentary. However, if the terminals 135 and 144 are connected to opposite sides of a second piezo-electric actuator, such as the actuator 120 in FIG. 5, then the oscillating piezo-electric actuator and its contacts can be made to discharge a second piezo-electric actuator and cause snap action of the contacts of the second switch.

Figure 12:
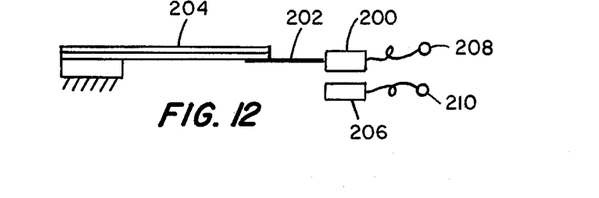

In FIG. 12 the moveable contact 200 is connected to the actuator 204 through a spring 202. It cooperates with fixed contact 206. The contacts are electrically isolated from all but terminals 208 and 210, respectively.

The structure will oscillate to move the moveable contact toward and away from fixed contact 206 in either of two modes. In a first mode, the actuator 204 is not used as a spring. If energized to undergo an initial defection it will set the combination of spring 202 and the weight of contact 200 into oscillation. In that first mode the actuator can be energized with no more than a d.c. or pulse signal.

If the actuator is energized with an alternating or interrupted d.c. signal at appropriate frequency, the actuator will exhibit spring characteristic which will be augmented by action of spring 202 to produce oscillatory motion of the contact 200. These two modes differ from the third mode in which the weight, contact or not, is carried directly by the actuator as in FIG. 4.

In FIG. 4 the weight 138 is an added element. The actuator itself has distributed mass. It will combine with the spring effect resulting from alternating voltage, or interrupted d.c. energization of the actuator to produce oscillation. The added, separate weight only decreases oscillation frequency.

Figure 13:
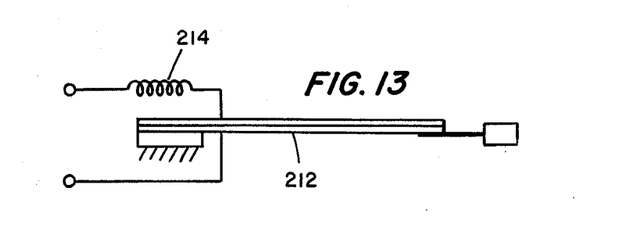

A fourth mode of oscillation is depicted in FIG. 13. Here, the actuator 212, which exhibits electrical capacitance, is connected in series with the energizing circuit through an inductor 214. Application of A.C. or interrupted d.c. at appropriate frequency results in oscillation of the actuator at the mechanical oscillation frequency (multiples and sub-multiples) of the actuator system.

Figure 7:
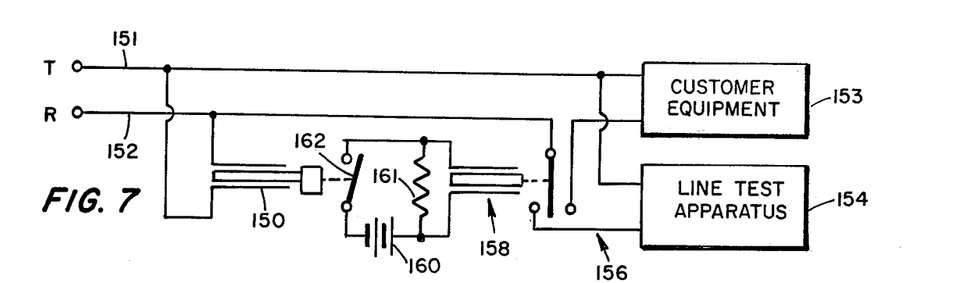
FIG. 7 is an elemental diagram of a remote disconnect circuit which employs the actuator of FIG. 6.

In tests of oscillating piezo-electric switch actuators, it has been demonstrated that in a switch which required the application of fifty unidirectional volts to bend the actuator sufficiently to cause switch closure, only 1.5 volts rms was required to accomplish switch closure using an alternating voltage that varied at the frequency of oscillation of the piezo-electric actuator. A circuit in which an oscillatory piezo-electric actuator is employed is shown in FIG. 7. The actuator 150 is connected across telephone lines 151 and 152. Line 151 is connected to one terminal of a two-terminal customer equipment 153 which might be a telephone or a computer modum. Line 151 is also connected to one terminal of a two-terminal line test apparatus 154. That apparatus might be a standard test load, as depicted in FIGS. 2 and 5, or it might be a sweep frequency signal generator. The other terminal of the customer equipment 153 and the line apparatus 154 are connected to the two poles of a single-pole, double-throw switch contact set 156 whose contactor is connected to line 152. The connector set is operated by a piezo-electric actuator 158 which is energized by a control signal transmitted along the telephone line. That is represented schematically in FIG. 7 by battery symbol 160, it being understood that that voltage is applied only long enough to charge the actuator 158 and then is removed. A low voltage alternating or interrupted d.c. signal at the frequency of oscillation of the actuator system 150 is applied to the actuator by the telephone lines. The actuator 150 is set into vibration as a consequence of the application of that signal and results in momentary closure of switch contact 162. That results in charging of the actuator 158 and resetting of the contacts 156. Leakage resistor 161 is connected across the actuator 158 so that it will reset when the actuator charge is dissipated. If desired in a particular case, the source 160 can be connected parallel with the actuator 158 and closure of contact 102 used to discharge actuator 158.

Figure 8:
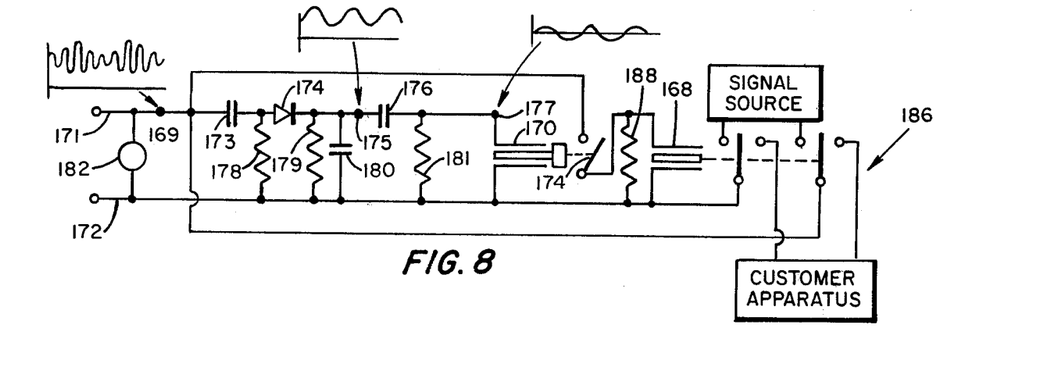
FIG. 8 is a circuit diagram of a refinement of the FIG. 7 circuitry.

A refinement of that circuit is shown in FIG. 8 where the numeral 168 designates the actuator of the double-pole, double-throw switch and the numeral 170 designates the oscillatory actuator. Actuator 170 is connected to the telephone line 171 through the series combination, beginning at line 171 of test point 169, a blocking capacitor 173, a rectifier 174, a test point 175, a blocking capacitor 176 and a test point 177. The other side of the actuator 170 is connected to line 172. A resistor 178 is connected across the lines 171 and 172 from a point intermediate capacitor 173 and rectifier 174. Another resistor 179 and a capacitor 180 are connected in parallel across the lines 171 and 172 at a point intermediate rectifier 174 and capacitor 176. Still another resistor 181 is connected across the lines from a point intermediate capacitor 176 and test point 177. The numeral 182 represents the source for an alternating or interrupted direct current control signal whose magnitude, in the example given above, need be no more than a few volts. In this case, it is the sinusoidal alternating currents superimposed upon a higher frequency carrier wave of the kind depicted by the wave form associated with test point 172. In practice, the carrier frequency will be one that falls falls within the pass band of the telephone line and the modulating signal would have a frequency below the pass band of the carrier signal. That modulated control signal is superimposed upon the "on hook" unidirectional voltage across line 171 and line 172 as depicted in the wave form at test point 169. The function of capacitor 173 is to block that d.c. voltage so that only the modulated alternating signal is applied to the rectifier 174. The function of resistor 178 is simply to discharge that blocking capacitor.

Rectifier 174, in combination with resistor 179 and capacitor 180, performs two functions. It rectifies ring signals and converts the ring signal energy to unidirectional energy which will be blocked by capacitor 176 and thereby precluded from having an affect upon the actuator 170. In addition, it is a function of the combination of rectifier 174, resistor 179 and capacitor 180 to demodulate the signal to recover the low frequency modulating signal. That signal and the unidirectional component which results from rectification of a ring signal is illustrated in the wave form associated with test point 175.

The direct current component in that wave form is eliminated by the action of capacitor 176 so that only the low frequency modulating signal remains as illustrated in the wave form associated with test point 177. The frequency of the low frequency modulating signal, and the resonant frequency of the actuator system 170, are selected so that the actuator will be set into oscillation when the low frequency modulating signal appears across the actuator. It will oscillate to open and close switch contacts 174. The switch contacts 174 are connected in series with the actuator 168 across lines 171 and 172. When the switch contacts are closed momentarily, the actuator 168 will be energized by the d.c. "on hook" voltage appearing on the line. Actuation of actuator 168 results in operating of the contact set 186 that is operated by the actuator 168. The relay contacts are reset after a time determined by the time constant of the actuator and the resistor 188 which is connected in parallel with it.

FIG. 8 assumes that the input carrier wave is amplitude modulated with the control signal. It will be apparent to those skilled in the art that other modulation schemes can be employed. Any modulation scheme can be employed. The one selected for illustration here was selected on the basis that it is easily depicted and easily understood.

Figure 9:
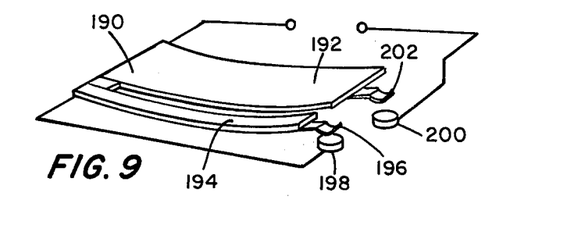
FIG. 9 is a schematic, isometric drawing of a physical form which the piezo-electric switch actuator may take.

It is possible for the two piezo-electric switches in these several systems that employ two switches to be formed from a single slab of piezo-electric material. That is illustrated in FIG. 9. The slab 190 is bifurcated so that one portion 192 is wider than the other portion 194. The two sections are of equal length. Each section carries a moveable contact which cooperates with a fixed contact. In this case the separation between the moveable contact 196 of the smaller section 194 is separated from its fixed contact 198 by less than the separation between fixed contact 200 and moveable contact 202 of the larger section 192. The conductive coatings on one side of the two sections are insulated from one another so that each section operates as an independent switch. The degree of bending is determined by the intensity of the electric field to which the actuator is subjected. If these two sections are applied to the same potential source, the smaller one will become charged and discharged more rapidly than will the larger section, so the smaller element can be expected to be moved more rapidly than the other section when being charged and discharged. Because the spacing between the contacts 196 and 198 is less than the spacing between contacts 200 and 202, the contacts 196 and 198 can be expected to close sooner than the contacts 200 and 202. That gives rise to the possibility of using the smaller section to discharge the larger section to produce snap action in the switching movements of contacts 200 and 202. Alternatively, one section (or both sections) may be energized with an alternating potential or an interrupted d.c. potential so that it operates (or they operate) as a vibrating actuator.

Figure 10:
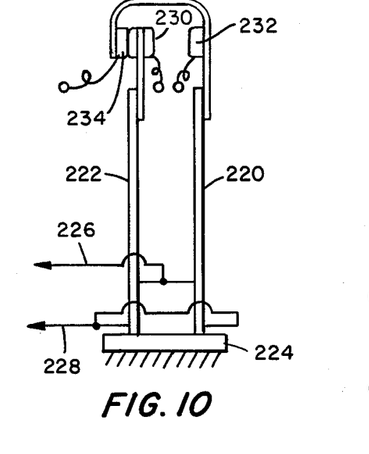
FIG. 10 is a schematic diagram of a preferred form of double-pole, single-throw switch.

In these several figures, the switch actuator has been represented as a single bar or as a multimorph of piezo-electric material. It is possible to employ two such piezo-electric elements energized so that they move in opposite directions. Doing that doubles the amount of motion available at the switch contacts for a given applied voltage within the practical range of voltages. A special switch construction to take advantage of that circumstance is illustrated in FIG. 10. What is shown is a double-pole, single-throw switch. Two piezo-electric elements 220 and 222 are arranged in parallel. Corresponding ends of the two elements are fixed to a base 224 and they are energized by lines 226 and 228 so that, if the applied voltage is such that the two actuators bend toward one another, then the moveable contact 230 will be moved into engagement with moveable contact 232. Each contact will move half the distance to the meeting point. During that action the contact 230 will be moved away from contact 234. Half of the separation will be accounted for by distortion of element 222, and the other half of the separation will be accounted for by motion of element 220. In this arrangement, contact separation can be doubled to lessen the possibility of arcing without need to increase the charging voltage. That construction can be used in any of the switches shown in the drawing. In fact, it is used in the switch 22 of FIG. 1.

Figure 11:
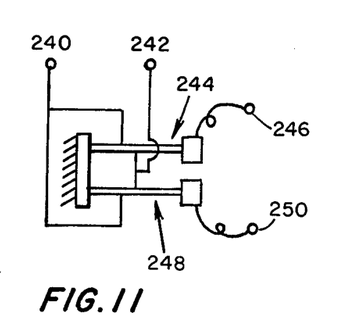
FIGS. 11, 12 and 13 are schematic diagrams illustrating alternative forms of oscillatory piezo-electric actuators.

FIG. 11 shows another variation in which two actuators are used. In this case both of the actuators are of the oscillatory type. They are energized in parallel from lines 240 and 242. The weights are electrically conductive. The weight of actuator 244 is connected to a terminal 246, and the weight of actuator 248 is connected to a terminal 250. When the two actuators are set into vibratory motion, the conductive weights will engage one another to complete a circuit between terminals 246 and 250. The signals that energize those oscillatory actuators have the frequency at which the actuators oscillate. If the two actuators oscillate at the same frequency, then only a single frequency signal need be applied. Alternatively, the two oscillatory actuators can be made to oscillate at different frequencies, in which case the signal applied across terminals 240 and 242 must include a component at each frequency. Here again, one can be energized with unidirectional voltage so that only the other is oscillatory.

Figure 14:
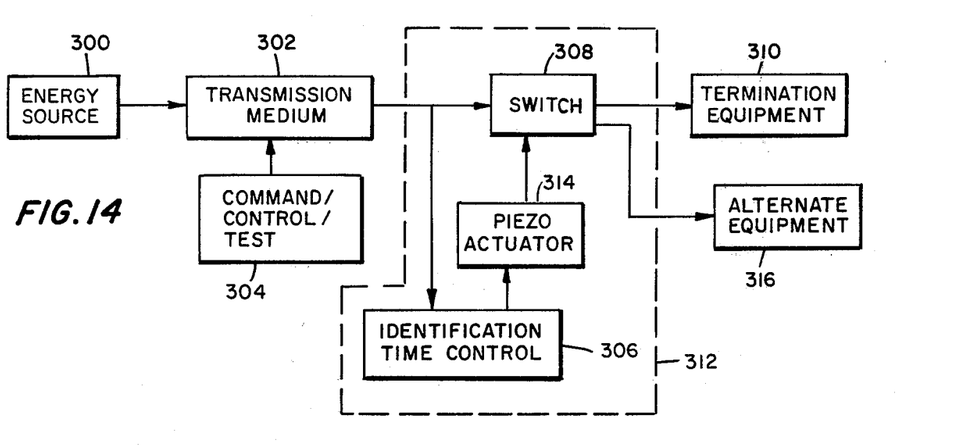
FIG. 14 is a block diagram of a more basic system in which the invention is embodied.

FIG. 1 is a block diagram of the invention as applied to a telephone system. The invention has other applications not the least of which is the interruption of the supply of energy to remotely located apparatus. The need to disconnect remotely positioned apparatus can occur in a variety of circumstances. For example, it may be desirable during the peak load period of an electric utility to ensure that low priority apparatus is disconnected from the line, rather than to disconnect entire power stations from a power grid at times of overload and risk massive power outages of the kind that have occured in the Northeastern United States. Instead, it is preferred to remove preselected high energy users from the line. FIG. 14 is a generalized block diagram which shows the use of any kind of electrical energy transmission line to accomplish remote switching with a signal applied to that same line. In FIG. 14, the numeral 300 represents a source of energy that is to be transmitted through an energy transmission medium 302. The energy that is applied to the transmission line by the source 300 may be electrical or optical, or have other physical forms. The energy transmission medium is one that is suitable to the energy form selected. Optical energy would be transmitted through a transparent medium; electrical energy would be transmitted in hard wire or in a radio link. Box 304 represents a source of control signal which is introduced into the energy transmission medium for transmission, either simultaneously or otherwise, through that medium to a switching apparatus generally designated 306. That apparatus includes a switching arrangement in series between the energy transmission medium and the normal destination for that energy. In FIG. 14 the switch itself is designated 308 and the destination, called the termination equipment, is numbered 310. The command or control signal that is introduced into the energy transmission medium from the command control source 304 is sensed in a command identification and timing control unit 312. Upon proper identification, that unit 312 causes actuation of a piezo switch actuator 314 which operates the actual switch 308. FIG. 14 includes another block 316 to which the energy flowing through the energy transmission medium may be transferred. The block 316 is intended to represent both the case where there is no alternative apparatus, where the function of the system is simply to interrupt furnishing of the source energy to the termination equipment, as well as to the situation where an alternative load is connected to the energy transmission medium.

Figure 15:
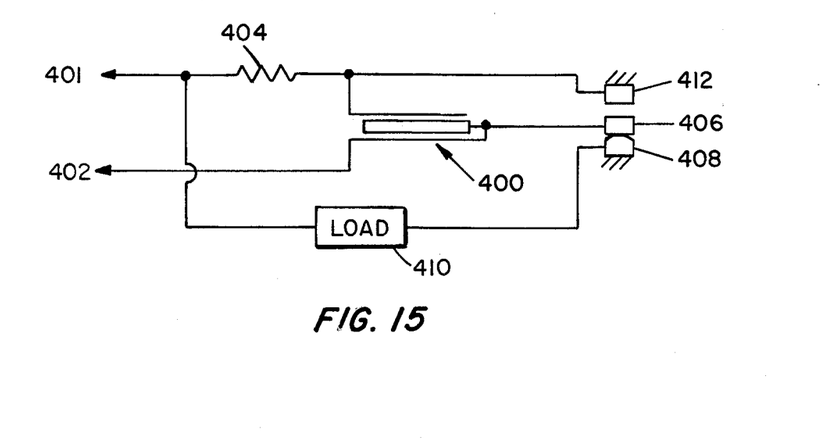
FIG. 15 is a schematic diagram of another form of vibrating or oscillatory piezo-electric switch.

In FIG. 15 the piezo-electric actuator 400 is charged from source 401/402 through a resistor 404. Since the piezo-electric actuator exhibits capacitance, a charge is built up in the actuator. The actuator bends to move moveable contact 406 away from fixed contact 408 to interrupt current to load 410. The load is connected across source 401/402 through contacts 406 and 408.

As its charge is increased the actuator bends to move contact 406 into engagement with fixed contact 412. Engagement discharges the piezo-electric actuator whereupon contacts 406 and 408 reengage. The load is reenergized while the actuator recharges and the cycle is repeated.

Although I have shown and described certain specific embodiments of my invention, I am fully aware that many modifications thereof are possible. My invention, therefore, is not to be restricted except insofar as is necessitated by the prior art.

In this connection it is important to understand that in any particular design, the normal switch position may be normally open or normally closed, and that the normal state of the actuator may be either charged and distorted or discharged and relaxed.

I claim:

1. A pair of piezo-electric deformation switches:
   means for energizing each of them to charged and deformed condition and for deenergizing each of them to discharged and relaxed condition;
   means for changing the energization of one of said switches at a controlled rate over a given time; and
   means for rapidly charging or discharging the other of said switches as an incident to change in a given degree in the energization of said one of said switches.

2. The invention defined in claim 1 in which said one switch includes contacts which are actuated when the energization of said one switch is altered, and which contacts are connected in circuit with said other of said switches such as to change the energization of said other switch when said contacts are actuated.

3. A pair of piezo-electric deformation switches:
   means for energizing each of them to charged and deformed condition and for deenergizing each of them to discharged and relaxed condition;
   means for changing the energization of one of said switches at a controlled rate over a given time;
   means for rapidly charging or discharging the other of said switches as an incident to change in a given degree in the energization of said one of said switches; and
   said means for changing energization of said one of said switches at a controlled rate comprising a resistive impedance connected in circuit with said one of said switches.

4. The invention defined in claim 3 in which said means for changing the energization of said switches comprises a voltage sensitive means in series with each of said switches for preventing energization of said switches to charged condition at applied voltage less than a predetermined voltage.

5. The invention defined in claim 3 in which said means for changing the energization of said switches comprises means for preventing altering the energization of said switches by electrical telephone ring signals.

6. The invention defined in claim 2 in which said pair of piezo-electric switches are connected for energization in parallel and in which the spacing of the contacts of said first switch is such that on deenergization of said switches the contacts of said one switch are actuated prior to actuation of the contacts of the other of said switches.

7. The invention defined in claim 1 in which said pair of switches is formed from a sinle piezo-electric element.

8. The invention defined in claim 1 in which the electrical capacitance exhibited by said one switch is less than the electrical capacitance of the other.

9. In a remote switching system for connecting a transmission line selectively to a normal load or to a testing apparatus, in combination:
   normal load terminals;

line testing apparatus;
transmission line terminals;
switch means for connecting the transmission line terminals selectively to the line testing apparatus rather than to the normal load terminals and comprising switching contacts and a piezo-electric actuator;
signal responsive means selectively responsive to switching signals appearing at said transmission line terminals for energizing said piezo-electric actuator to actuate said contacts such as to effect disconnection of said transmission line terminals from said normal load terminals and interconnection of said transmission line terminals with said line testing apparatus; and
reconnection circuit means for causing de-energization of said piezo-electric actuator at a selected time such as to cause reconnection of said transmission line terminals to said normal load terminals.

10. The invention defined in claim 9 in which said signal response means comprises a charging circuit for connection to said transmission line terminals which charging circuit includes said piezo-electric actuator and a high voltage sensing means for preventing charging of said piezo-electric actuator unless the voltage across said transmission line terminal exceeds some minimum voltage.

11. The invention defined in claim 10 in which said switch means comprises a pair of piezo-electric actuators;
first and second spaced switch contacts carried by one of said piezo-electric elements;
a third switch contact structure carried by the other of said piezo-electric actuators such that it engages said first switch contact when neither of said actuators is charged;
said actuators being positioned to bend upon both being charged such that said second contact and said third contact structure are brought into engagement with one another and such that said first and second contacts are disengaged.

12. The invention defined in claim 10 in which said charging circuit includes circuit means effective to preclude energization of said actuator to effect actuation of said switch contacts by electrical voice and telephone ring signals.

13. The invention defined in claim 10 in which said reconnection means comprises a second piezo-electric switch having a second piezo-electric actuator responsive to said switching signals and having contacts connected to discharge said first mentioned piezo-electric actuator.

14. The invention defined in claim 9 in which said reconnection circuit means comprises a second piezoelectric switch whose contacts are connected on closure to alter the energization of said first mentioned actuator and whose actuator is mechanically oscillatory at a predetermined frequency in a degree to effect closure of said contacts of said second switch.

15. The invention defined in claim 9 in which said reconnection circuit means comprises means for discharging said piezo-electric actuator at a controlled rate and snap action means responsive, at a predetermined reduced level of charge, for abruptly changing the switching state of said switching contacts.

16. The invention defined in claim 15 in which said snap action means comprises a mechanical overcenter mechanism powered by said actuator.

17. The invention defined in claim 15 in which said snap action means comprises a pair of magnetic elements one moveable with said actuator and the other fixed.

18. A piezo-electric switch comprising:
a piezo-electric switch actuator;
switch contacts responsive to deformation and relaxation from deformation of said actuator to change switching state;
actuator energizing and deenergizing means comprising a series circuit containing said piezo-electric actuator means for preventing current flow through said series circuit at applied unidirectional voltages less than a given voltage while permitting current flow in either direction at voltages higher than said given voltage.

19. The invention defined in claim 18 which further comprises the parallel combination of a resistor and a diode connected in said series circuit.

20. A pair of piezo-electric switches each comprising an actuator which deforms upon being energized and relaxes upon being deenergized:
circuitry for energizing and deenergizing one of said actuators; and
switch contacts in said circuitry and operable by the other of said actuators to change the state of energization of said one of said actuators.

21. The invention defined in claim 20 in which said other of said actuators is effective to operate said switch contacts in response to a periodically varying voltage.

22. The invention defined in claim 20 in which contacts are connected in series circuit with said one actuator.

23. The invention defined in claim 20 in which said contacts are connected in parallel circuit with said one actuator.

24. The invention defined in claim 20 in which one of said switches has a contact spacing less than the contact spacing of the other.

25. The invention defined in claim 20 in which one of said piezo-electric switches exhibits more electrical capacitance than does the other.

26. In a remote disconnect system for connection in a signal transmission line:
a segment of transmission line;
a switch in said line;
a piezo-electric actuator operative to actuate said switch in response to an electrical signal transmitted along said line; and
means for distinguishing said electrical signal from other signals on said line and for preventing operation of said actuator in response to other than said energization signal.

27. The invention defined in claim 26 which further comprises snap action means for causing said contact set to actuate from one switch state to another with a snap action.

28. The invention defined in claim 27 in which said snap action means comprises at least one of a mechanical, magnetic of electrical snap action element.

29. An oscillator switch comprising a piezo-electric actuator and switch contacts connected when closed to short circuit said actuator and an actuator charging circuit comprising said actuator and a series resistor.

* * * * *